Dec. 23, 1941.   E. R. CHILCOTT ET AL   2,267,323
CLAMP DEVICE
Filed Aug. 23, 1939

Inventors.
Edward R. Chilcott.
Harold J. Hill.
Walter H. Righter.

Attorney.

Patented Dec. 23, 1941

2,267,323

UNITED STATES PATENT OFFICE 2,267,323

CLAMP DEVICE

Edward R. Chilcott, Glendale, Harold J. Hill, North Hollywood, and Walter H. Righter, Glendale, Calif., assignors, by mesne assignments, to Medical Engineering Company, Los Angeles, Calif., a co-partnership composed of Stuart C. Knox, T. Keith Glennan, and Daniel Cornwall Hickson Application August 23, 1939, Serial No. 291,566

6 Claims. (Cl. 287—54)

This invention relates generally to clamping devices, and more particularly to clamping devices adapted for quick manual application to a rod or shaft. The clamping device of the present invention is adapted particularly for use in connection with a fracture frame which is the subject matter of a copending application of Stuart C. Knox entitled Fracture frame, filed August 1, 1939, Ser. No. 287,779, now Patent No. 2,239,821, dated April 29, 1941, and will be described in a specific form especially designed for that particular application; it will of course be obvious, however, that the device of the present invention is adaptable to a variety of uses other than the illustrative application to fracture frames, and no limitation to any particular type of use is therefore to be implied.

In the fracture frame disclosed in the aforesaid copending application which is now a patent, there are provided a number of cross bars each having a clamping device at each end by which it may be clamped between parallel rails or rods of the frame. It is desirable that the clamping device employed for clamping these cross bars to the members of the frame be of a quick attachable and detachable type, and that they be capable of being set up very tight without the application of great manual exertion.

The general object of the present invention is therefore to provide an improved form of clamp for such typical uses as clamping a bar or other member to a rod or shaft, which is capable of being applied or removed by a simple manual operation, and which is capable of being manually set up to exert a comparatively tight gripping force, but without requiring great manual exertion.

The clamp device provided by the present invention embodies two clamp parts, hinged together, and adapted to surround the shaft to which the clamp device is to be applied. One of these clamp parts is on the end of a shank, around which is a rotatable clamping sleeve. The other of the clamp parts has a lug which is overridden by an eccentric or cam surface inside of the clamping sleeve. Rotation of this sleeve brings its cam surface to bear with gradually increasing pressure on this lug, and so compresses the clamp part having the lug radially inward. The cam surface is preferably relatively long, though of small pitch, and great clamping force is accordingly exerted with relatively small twisting force on the sleeve.

The invention itself will be understood by now referring to the following detailed description of a present preferred embodiment thereof, reference for this purpose being had to the accompanying drawing, in which.

Figure 1:
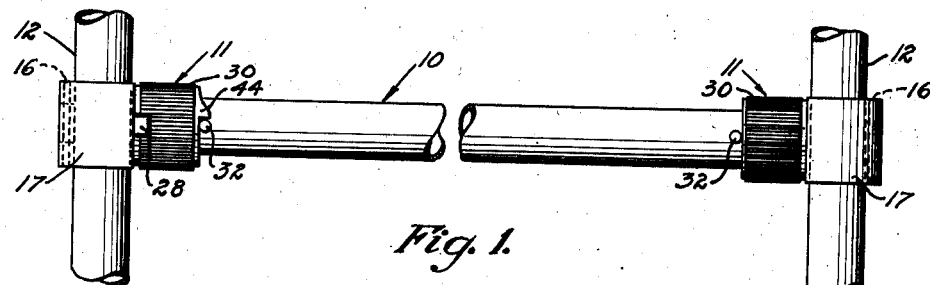
Fig. 1 shows a pair of clamp devices in accordance with the invention, mounted at opposite ends of a tubular rod and clamped to a pair of parallel vertical rods or shafts.

In the drawing, numeral 10 designates generally a tubular rod or bar, having mounted on its opposite ends clamp devices 11 in accordance with the present invention. The clamp devices 11 are shown as applied to a pair of parallel, vertical rods or shafts 12. These vertical rods 12 may be regarded as a pair of vertical cross bars of the fracture frame of the aforementioned copending application now a patent, the member 10 being a cross bar which is clamped to and between vertical members 12, and which may be employed as a load sustaining member, thus making necessary that the clamp devices have non-slipping engagement with the vertical members 12. Fig. 1 of course shows merely one typical use and application of the clamp device of the present invention, no limitation to fracture frames being implied; however, the arrangement of Fig. 1 is nicely illustrative of typical uses to which the invention is adaptable.

The clamp device 11 has, in the specific form here chosen for illustration, a cylindrical shank 13 received within the end of tubular member 10. Integrally formed with this shank 13, and disposed beyond the end of tubular member 10, is a substantially semi-cylindric clamp portion or strap 15, adapted to fit approximately half way around the member 12 to which the clamp is applied. Hinged to member 15, as by means of hinge pin 16, is a substantially semi-cylindric closure strap 17. The inner surfaces of the members 15 and 17 when in closed position define a substantially cylindrical opening 18 within which the member 12 is received. Member 17 is adapted to swing open on hinge pin 16 to the position illustrated in dotted lines in Fig. 3 to permit the device to be applied to the member 12, after which member 17 is swung to its closed position as illustrated in full lines in Fig. 3.

Shank 13 has, forwardly of the end of tubular member 10, a portion or section 23 enlarged to the diameter of member 10, thereby forming a shoulder 24 opposed to the end of member 10, and this enlarged portion 23 of the shank joins with the strap member 15, as illustrated. A portion of this enlarged diameter section 23 of the shank is cut away on the side opposite strap member 15, forming a surface 25 flush with the end of tubular member 10, the surface 25 being connected with the inner surface of strap member 15 by an inclined surface 27. A locking lug 28 projecting from the hinged closure strap 17 is received in the space so provided, its end facing surface 25 when the closure strap is closed, and its inclined under surface 29 being presented in opposition to surface 27, but being normally spaced somewhat therefrom (see Fig. 3).

The enlarged portion 23 of shank 13 terminates in a shoulder 23a formed in a plane transverse to the axis of tubular member 10, and closure strap 17 has, around lug 28, a shoulder 17a coplanar with shoulder 23a.

A clamping ring or sleeve 30 is rotatable on the end of tubular member 10 and on shank portion 23, between shoulders 23a and 17a and the end of a pin 32 extending through tubular member 10 and shank 13, pin 32 being set tightly in tubular member 10, while the bore 13a in shank 13 through which pin 32 projects may, in some instances, be made somewhat oversize, for a purpose presently to be explained. The end portion of rotatable clamping sleeve 30, that is, the portion that overrides lug 28, has an internal eccentric or cam surface 35, and also has a notch 36 adapted to pass lug 28 when positioned in alinement therewith (see Fig. 2). As illustratively shown in Fig. 5, this surface 35 is eccentric to shank 13, and is preferably comparatively long, so as to afford a powerful inward wedging action on lug 28. For the purpose of the claims the expression cam will be adopted as generic to either cam surfaces of special shapes or true eccentric surfaces, it being evident that even when the surface 35 is a true eccentric, it nevertheless functions as a cam.

Figure 2:
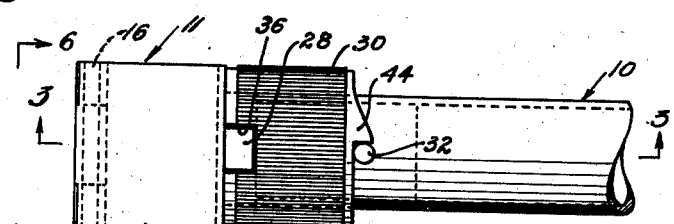
Fig. 2 is an elevation of one of the clamp devices, showing the clamping sleeve in released position.
Figure 3:
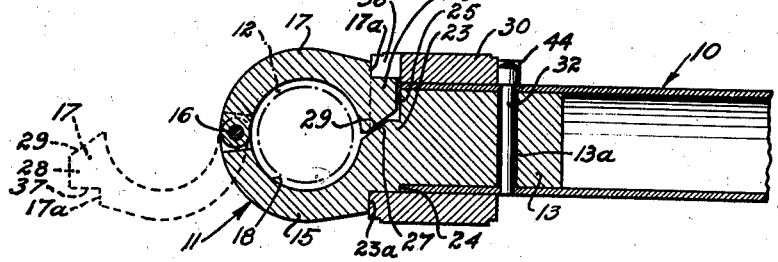
Fig. 3 is a section taken on line 3—3 of Fig. 2.
Figure 4:
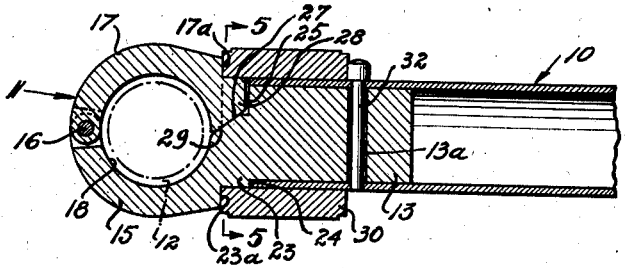
Fig. 4 is a view similar to Fig. 3, but showing the device in fully clamped position.
Figure 5:
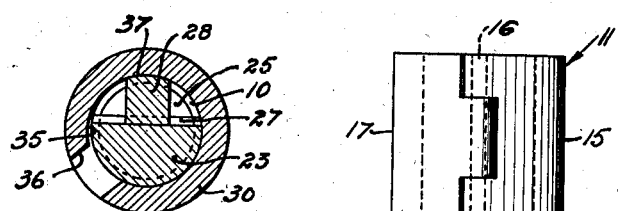
Fig. 5 is a section on line 5—5 of Fig. 4.
Figure 6:
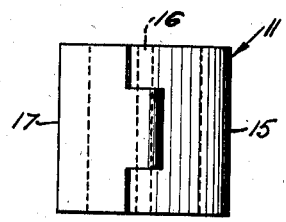
Fig. 6 is an end view of the clamp, being taken in the direction of arrows 6—6 in Fig. 2.

The clamp device being in the position of Figs. 2 and 3, rotation of sleeve 30 to the position of Figs. 4 and 5 causes cam surface 35 to engage and bear inwardly against the surface 37 on the outer side of lug 28, the locking sleeve thus becoming tightly wedged against lug 28 so that it is restrained against displacement by the frictional engagement with said lug. This causes the clamp member 17 to be moved inwardly against the rod 12, the member 17 being capable of movement from the full line position of Fig. 3 to the position of Fig. 4, at which time opposing surfaces 27 and 29 on the members 15 and 17 would come into engagement, thus limiting further inward movement.

The long cam or eccentric surface 35 permits great force to be exerted against the gripped rod 12 without application of a great amount of manual exertion. Furthermore, when the locking sleeve 30 is set up, the frictional engagement between the inter-engaging surfaces 35 and 37 on the locking sleeve and lug is such that accidental release will not occur. On the other hand, only a small degree of exertion is required to release the locking sleeve from its frictional locking engagement with the lug 28. Thus the clamping device may be very tightly clamped to or released from the rod 12 with the application of but comparatively slight twisting pressure, being easily operable with the fingers.

A stop lug 44 formed on sleeve 30 engages pin 32 when locking lug 28 is in alinement with aperture 36, this provision enabling the position at which the clamp device may be opened to be readily found.

It was previously mentioned that the transverse aperture 13a through which pin 32 projects is preferably or in some cases made somewhat oversize, thus permitting shank 13 some degree of longitudinal as well as rotative movement within the end of tubular member 10. This provision enables the cross bar to be more readily clamped between two longitudinal members such as 12 which are a fixed distance apart, it being apparent that if no such play were provided, the slightest difference in distance from center to center of the members 12 and from center to center of the clamp devices at the two ends of the connecting member 10 would bring about difficulty in applying the clamps. The feature of a clamp device loosely mounted on the end of a rod as incorporated in a fracture frame is claimed in the aforementioned application of Stuart C. Knox, Ser. No. 287,779.

It will be understood that the drawing and description are for illustrative purposes only, and that various changes in design, structure and arrangement may be made without departing from the spirit and scope of the invention or of the claims appended hereto.

We claim:

1. A clamp for rods and the like comprising two strap members defining a rod-receiving opening, a hinge connection between corresponding ends of said strap members, a shank on the opposite end of one of said strap members extending transversely of said rod receiving opening, a locking sleeve rotatable about said shank, means confining said sleeve against substantial longitudinal movement on said shank, a portion of said sleeve at its end adjacent said strap members being formed with an internal radially acting cam surface, a lug projecting from the other of said strap members adapted to be received within the end portion of said sleeve and to be engaged by said cam surface, and said sleeve having a notch adapted to pass said lug in one position of rotation of said sleeve.

2. A clamp for rods and the like comprising two strap members defining a rod-receiving opening, a hinge connection between corresponding ends of said strap members, a shank on the opposite end of one of said strap members extending transversely of said rod receiving opening, a tubular member mounted on said shank, said shank having an enlarged section of the same diameter as the exterior diameter of said tubular member between the end of said tubular member and said strap member, a locking sleeve rotatable on said tubular member and on said enlarged section of said shank, a portion of said sleeve overlying said enlarged section of said shank having an internal cam surface, a portion of the enlarged section of the shank being cut away on the side opposite said strap member, and a lug projecting from the other of said strap members and received within the space so provided and within the end portion of said locking ring, said lug being operatively engaged by said cam surface.

3. A clamp for rods and the like comprising two strap members defining a rod-receiving opening, a hinge connection between corresponding ends of said strap members, a shank on the opposite end of one of said strap members extending transversely of said rod receiving opening, a tubular member mounted on said shank, said shank having an enlarged section of the same diameter as the exterior diameter of said tubular member between the end of said tubular member and said strap member, a locking sleeve rotatable on said tubular member and on said enlarged section of said shank, a portion of said sleeve overlying said enlarged section of said shank having an internal cam surface, a portion of the enlarged section of the shank being cut away on the side opposite said strap member, and a lug projecting from the other of said strap members and received within the space so provided and within the end portion of said locking ring, said lug being operatively engaged by said cam surface, and said sleeve having a notch adapted to pass said lug in one postion of rotation of said sleeve.

4. A clamp for rods and the like comprising two strap members defining a rod-receiving opening, a hinge connection between corresponding ends of said strap members, a shank on the opposite end of one of said strap members extending transversely of said rod receiving opening, a tubular member mounted on said shank, said shank having an enlarged section of the same diameter as the exterior diameter of said tubular member between the end of said tubular member and said strap member, a locking sleeve rotatable on said tubular member and on said enlarged section of said shank, the strap member associated with the shank having a shoulder confining said sleeve against longitudinal movement toward said strap member, and means for confining the sleeve member against substantial longitudinal movement in the opposite direction, a portion of said sleeve overlying said enlarged section of said shank having an internal cam surface, a portion of the enlarged section of the shank being cut away on the side opposite said strap member, and a lug projecting from the other of said strap members and received within the space so provided and within the end portion of said locking ring, said lug being operatively engaged by said sam surface.

5. A clamp for rods and the like comprising two strap members defining a rod-receiving opening, a hinge connection between corresponding ends of said strap members, a shank on the opposite end of one of said strap members extending transversely of said rod receiving opening, a mounting member having a tubular end portion in which said shank is received, said shank and mounting member being associated for relative longitudinal and rotative movement, means limiting such relative longitudinal and rotative movement, said means comprising a pin set tightly in and extending transversely through said tubular end portion of said mounting member and an oversize aperture in said shank receiving said pin, a locking ring rotatable about said shank, an internal cam surface on said ring, and a lug projecting from the other of said strap members adapted to be received within said ring and operatively engaged by said cam surface.

6. A clamp for rods and the like, comprising a contractible strap means defining a rod-receiving opening and having two opposed ends adapted to be moved relatively toward each other to clamp a rod in the opening, a shank on one end of the strap means extending transversely of the rod receiving opening, a locking sleeve rotatable about the shank, a lug projecting from the other end of the strap means and adapted to be received within the end portion of the sleeve adjacent the strap means, the sleeve having a notch adapted to register with and pass the lug in one position of rotation of the sleeve, the inner surface of the sleeve adapted to engage an outer surface of the lug, and one of said engaging surfaces being provided with a cam formation extending circumferentially of the sleeve, whereby rotation of the sleeve from its position in which its notch registers with the lug forces the lug toward the shank and contracts the strap means.

EDWARD R. CHILCOTT.
HAROLD J. HILL.
WALTER H. RIGHTER.

CERTIFICATE OF CORRECTION.

Patent No. 2,267,323.  December 23, 1941.

EDWARD R. CHILCOTT, ET AL.

It is hereby certified that error appears in the printed specification of the above numbered patent requiring correction as follows: Page 3, second column, line 1, claim 4, for "sam" read --cam--; and that the said Letters Patent should be read with this correction therein that the same may conform to the record of the case in the Patent Office.

Signed and sealed this 17th day of February, A. D. 1942.

(Seal)

Henry Van Arsdale,
Acting Commissioner of Patents.